(12) United States Patent
Ross et al.

(10) Patent No.: US 11,573,577 B2
(45) Date of Patent: Feb. 7, 2023

(54) METHOD AND SYSTEM FOR OPTIMAL TRAJECTORY PATH TASKING FOR AN UNMANNED AERIAL VEHICLE (UAV)

(71) Applicant: THE UNITED STATES OF AMERICA, AS REPRESENTED BY THE SECRETARY OF THE NAVY, Arlington, VA (US)

(72) Inventors: Isaac M. Ross, Monterey, CA (US); Ronald J. Proulx, Waban, MA (US); Mark Karpenko, Salinas, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 290 days.

(21) Appl. No.: 16/777,421

(22) Filed: Jan. 30, 2020

(65) Prior Publication Data

US 2020/0241569 A1    Jul. 30, 2020

Related U.S. Application Data

(60) Provisional application No. 62/798,602, filed on Jan. 30, 2019.

(51) Int. Cl.
*G05D 1/10* (2006.01)
*G06N 3/12* (2006.01)
*B64C 39/02* (2006.01)

(52) U.S. Cl.
CPC ........... *G05D 1/101* (2013.01); *B64C 39/024* (2013.01); *G06N 3/126* (2013.01); *B64C 2201/141* (2013.01)

(58) Field of Classification Search
CPC .................. G05D 1/101; B64C 39/024; B64C 2201/141; G06N 3/126
See application file for complete search history.

(56) References Cited

U.S. PATENT DOCUMENTS

| 8,880,246 | B1 | 11/2014 | Karpenko et al. |
| 9,038,958 | B1 | 5/2015 | Ross et al. |
| 9,849,785 | B1 | 12/2017 | Ross et al. |
| 9,983,585 | B1 | 5/2018 | Ross et al. |
| 10,476,584 | B1 | 11/2019 | Minelli et al. |
| 10,627,834 | B2 * | 4/2020 | Yamasaki ............ G05D 1/0005 |
| 2019/0332105 | A1 * | 10/2019 | Sant ..................... G05D 1/0044 |

* cited by examiner

*Primary Examiner* — Peter D Nolan
*Assistant Examiner* — Roy Rhee
(74) *Attorney, Agent, or Firm* — Naval Postgraduate School; Scott Bell

(57) ABSTRACT

A method and system for generating an optimal trajectory path tasking for an unmanned aerial vehicle (UAV) for collection of data on one or more collection targets by a sensor on the UAV.

12 Claims, 9 Drawing Sheets

METHOD AND SYSTEM FOR OPTIMAL TRAJECTORY PATH TASKING FOR AN UNMANNED AERIAL VEHICLE (UAV)

CROSS-REFERENCE TO RELATED APPLICATIONS

This patent application is a non-provisional of and claims benefit from U.S. Provisional application 62/798,602 filed Jan. 30, 2019, which is hereby incorporated by reference in its entirety.

BACKGROUND OF THE INVENTION

1. Field of the Invention

The present invention relates generally to a method and system for optimal trajectory path tasking for an unmanned aerial vehicle (UAV).

2. Description of the Related Art

A UAV payload tasking problem may be generally described as follows: based on need, a sequence of tasks drawn from a requisition set for a mission is determined. The problem is to determine a tasking sequence that may be executed as a payload maneuvering sequence that satisfies various constraints (physics, operations and economics) while maximizing a given payoff function or a series of payoff functions (e.g., profit), also termed a value function(s), as determined by the operator of the UAV system. The payload tasking problem can be mathematically transcribed to a hybrid dynamic optimization problem defined over some digraph.

In this prior art framework, each vertex of the digraph represents a specific (labeled) task that may or may not be performed depending on the contribution of the task to the value of the payoff function. The edges of the graph typically represent the length of time required to maneuver the UAV payload between the vertices. The edges of the graphs could additionally represent another appropriate measure of the resources necessary to maneuver or otherwise transition to a new vertex. The UAV payload tasking problem of finding an optimal tasking sequence in which all the needed tasks meet the physical and timing constraints of the mission is conventionally considered by those familiar with the art as an NP-hard problem.

The current state-of-the-art for UAV payload tasking may be categorized along the following generalized steps: Step 1: The cardinality (number of elements) of the tasking list set is reduced to the greatest possible extent through the use of operator defined heuristics. This step produces a sparse subgraph whose complexity is reduced to more manageable levels. Step 2: The entire set of payload motion planning problems that constitute the graph edges is eliminated by choosing instead a simple closed-form solution for predicting payload maneuvering time or another appropriate measure of the resources necessary to maneuver or otherwise transition between tasks. This step transforms the reduced hybrid dynamic optimization problem of Step 1 to a non-dynamic but still time-dependent graph problem. Step 3: The problem of Step 2 is decomposed into separate sub-problems of motion planning and task scheduling. Each sub-problem is solved using a combination of heuristics and graph-theoretic algorithms, e.g., the travelling salesman or orienteering problem. A solution to the task scheduling sub-problem generates a task sequence that maximizes a given payoff function, e.g., resource utilization, profit, etc. Step 4: The tasking sequence generated by Step 3 is used to test the feasibility of operating the payload to execute or otherwise perform the tasking sequence by simulating the entire multi-point mission trajectory using a simulator (propagator) having a fidelity determined by an operator of the process. If this test fails, the entire process or parts of the process are repeated (usually via an operator in the loop) until a feasible solution is obtained for flight operations.

SUMMARY OF THE INVENTION

Embodiments in accordance with the present invention eliminate many of the heuristics, simplification steps, and iterative loops associated with prior art UAV payload tasking methods by considering the entire tasking problem as a single integrated dynamic optimization problem. Advantageously, many of the simplifications and assumptions made in the application of the prior art techniques can be avoided in favor of a higher fidelity solution that enhances the payoff (mission value) as compared to the techniques of the prior art.

A method and system for generating an optimal tasking sequence together with an associated mission trajectory, also referred to herein as an optimal trajectory path tasking, for an unmanned aerial vehicle (UAV) for collection of data on one or more collection targets by a sensor, such as an electro-optical (E/O) camera on the UAV, are detailed further herein. Embodiments in accordance with the invention are best understood by reference to the following detailed description when read in conjunction with the accompanying drawings.

BRIEF DESCRIPTION OF THE DRAWINGS

FIG. 10 illustrates sigmoid functions for various values of the slope parameter a.

Embodiments in accordance with the invention are further described herein with reference to the drawings.

DETAILED DESCRIPTION OF THE INVENTION

1. Introduction

Figure 1:
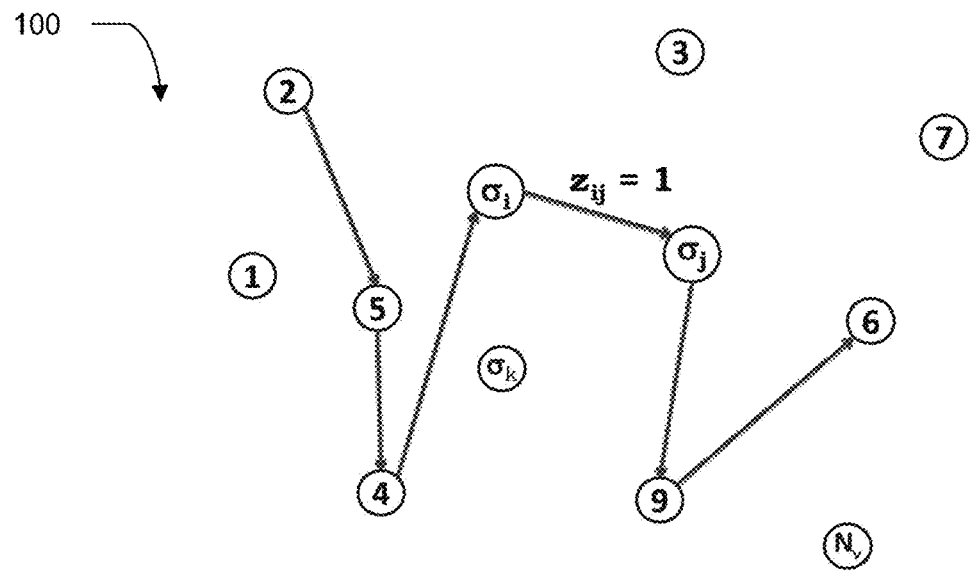
FIG. 1 is a schematic of a graph for a UAV collection motion planning and task scheduling problem modeled as an orienteering problem.

A typical orienteering problem can be defined in terms of a graph. The objective is to determine a time-limited task sequence, also known as a walk, that maximizes the total collection value or collection score derived from the visited vertices, as shown for example in FIG. 1. Because not all vertices can be visited, an orienteering problem generalizes the classic traveling salesman problem. The problem and its variants are also known by many other names: the generalized traveling salesman problem, the traveling salesman problem with profits, etc. The orienteering problem represents many practical problems in commercial vehicle routing, military operations, tourist trip planning, etc.

Figure 2:
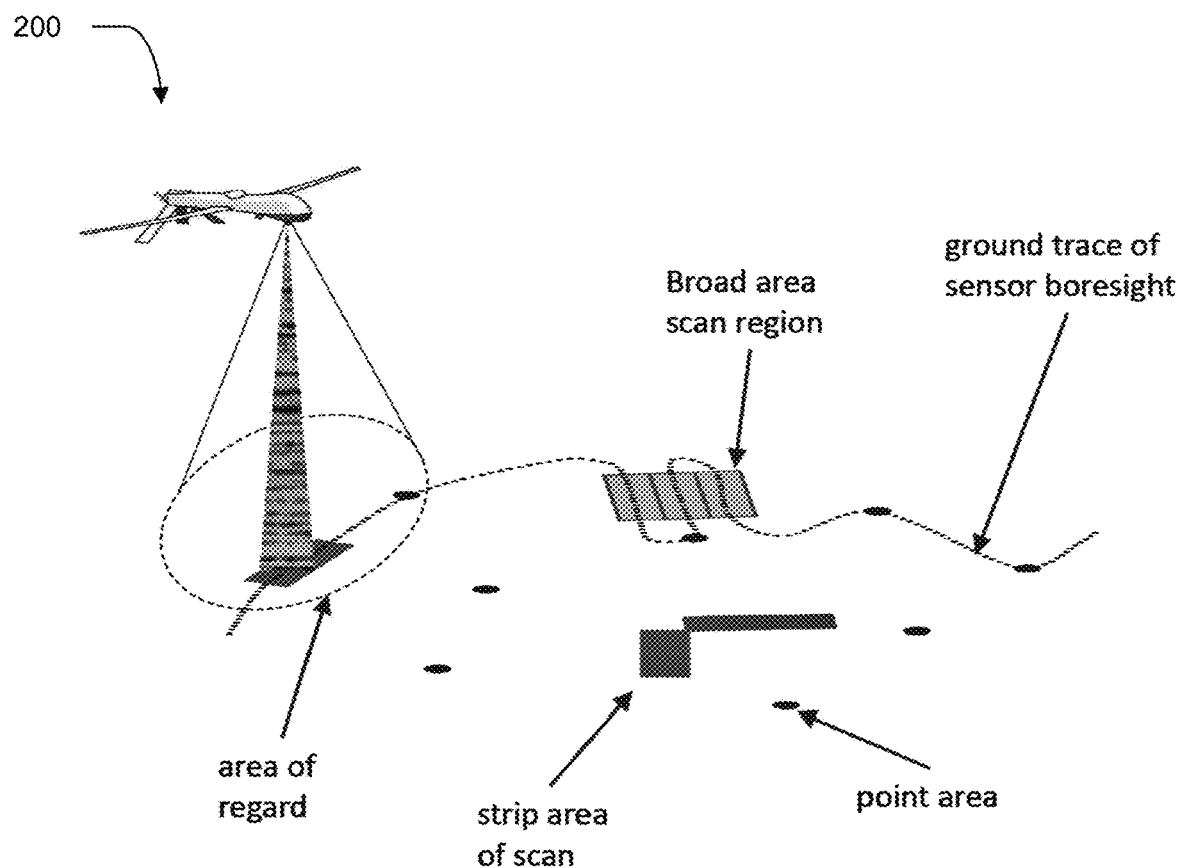
FIG. 2 illustrates a UAV collection tasking problem to be solved using the method of the invention.

Consider an unmanned air vehicle (UAV) equipped with a sensor, such as an electro-optical (EO) camera, in its payload bay, as shown in FIG. 2. The UAV is tasked to collect over a set of discrete imaging collection areas, where each collection area is valued or otherwise scored at some given number. In a collection planning and scheduling problem, the UAV is required to maximize the total collection value (of collections on collection areas) within a given time window. Thus, the UAV collection planning and scheduling problem is an orienteering problem.

A typical orienteering problem is framed in terms of a binary decision variable, $z_{ij} \in \{0,1\}$, where $z_{ij}=1$ indicates that the arc ij is traversed (see FIG. 1), and $z_{ij}=0$ implies otherwise. Let $t_{ij}$ denote the travel time or maneuver time needed to transition between vertices i and j, and $\sigma_i$ denote the score at the $i^{th}$ vertex. Then, an orienteering problem can be mathematically framed as equation 1, $$(OP) \begin{cases} \underset{z_{ij}}{\text{Minimize}} & \sum_j \sum_i \sigma_i z_{ij} \\ \text{Subject to} & \sum_j \sum_i t_{ij} z_{ij} \leq t_{max} \\ & z_{ij} \in \{0,1\} \\ & c_{ij}(z_{ij}) \leq 0 \end{cases} \quad (1)$$

where $t_{max}$ is the given time window and $c(z_{ij})$ represents all other constraints that constitute the full problem formulation. In adapting equation 1 to a dynamics-driven problem, the travel time $t_{ij}$ is obtained by solving a minimum-time optimal control problem as shown in equation 2, $$t_{ij} := t_j - t_i = \begin{cases} \text{Minimize} & J[x(\cdot), u(\cdot), t_i, t_j] := t_j - t_i \\ \text{Subject to} & \dot{x}(t) = f(x(t), u(t)) \\ & x \in \mathbb{X}, u \in \mathbb{U} \\ & (x_i, t_i, x_j, t_j) \in \mathbb{E} \end{cases} \quad (2)$$

where, $t_i$ and $t_j$ are the clock times at vertices i and j respectively, $\dot{x}=f(x,u)$ is a model of the dynamics of the UAV of a fidelity determined by an operator of the process that is described in standard state-space coordinates with u as the control variable, and $\mathbb{X}$, $\mathbb{U}$ and $\mathbb{E}$ are sets of appropriate dimensions that denote restrictions or other constraints on the state variable, control, and endpoints respectively. Substituting equation 2 in equation 1 generates a hybrid optimal control problem where the outer optimization loop of equation 1 is combinatorial and the inner loop of equation 2 is trajectory optimization.

In the present invention a reverse process is used advantageously by substituting equation 1 instead into equation 2 as opposed to substituting equation 2 in equation 1 as in the prior art. One advantage of the reverse process is that the combinatorial problem becomes imbedded in the continuous-time problem. As a result, the entire problem can be addressed under a single unified algebra of continuous-time calculus rather than through the use of prior art graph theoretic ideas.

2. Label Space Representation of a Tasking Graph

The dynamics of a UAV and its payload can naturally be described as a state space; however, the development of a state space for a UAV begins with some choices of coordinate systems, definitions of vectors, their parametrization etc. These choices can be made by an operator of the system. The appropriate space for a collection tasking graph is a label space. Analogous to the development of the state space, the label space needs to be developed from an underlying space of categorical variables. These are problem specific and may be defined by an operator of the process. Nonetheless, the graph variables are typically and readily defined in the preferred embodiment in terms of non-numerical symbols, integers and real variables. To each vertex of the graph, is associated a set in some $N_i$-dimensional real-valued label space, $\mathbb{R}^{N_i}$ where $N_i \in \mathbb{N}$. As a means to illustrate the development of a real-valued label space, consider the following example shown in equation 3 of a categorial vector associated with a vertex of a collection planning graph, $$\begin{pmatrix} \text{vertex } idnumber \\ \text{collection area shape} \\ \text{geometry} \\ \text{elevation} \end{pmatrix} = \begin{pmatrix} AC34939 \\ \text{strip} \\ (36.6°, 121.9°, 6.45°, 10 \text{ km}) \\ (30.0°, 75.0°) \end{pmatrix} \quad (3)$$

In equation 3, AC34939 is a value of a vertex identification variable that locates a vertex, strip is a value of a collection area shape variable (other values may be line, point etc.), a vector (36.6°,121.9°,6.45°,10 km) is a value of the geometry variable given by the latitude, longitude, orientation angle, and length of a collection strip respectively, and (30.0°),75.0° is a pair of angles corresponding to allowable elevation angles of camera boresight as measured from the ground.

In a first step of developing a real-valued label space, any categorial variables are organized into two groups of (1) discrete values and (2) real values. For example, for the vector given in equation 3, the groups of discrete values and real values can be written as, $$\text{discrete values} = (AC34939, \text{strip}) \quad (4)$$

$$\text{real values} = (30.0°, 75.0°, 36.6°, 121.9°, 6.45°, 10 \text{ km}) \quad (5)$$

Figure 3:
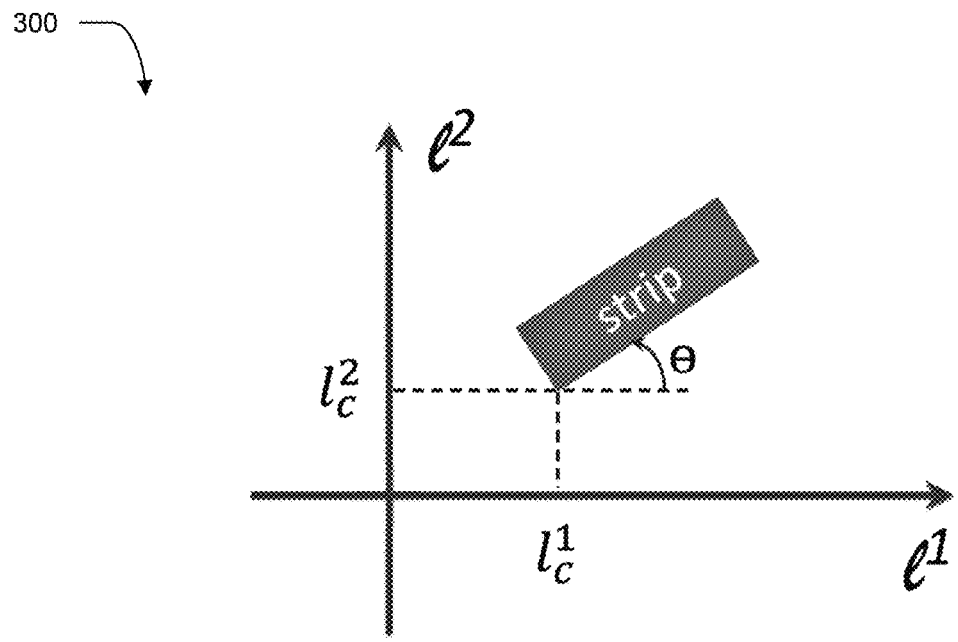
FIG. 3 is a two-dimensional illustration of a label-space representation of a strip vertex.
Figure 4:
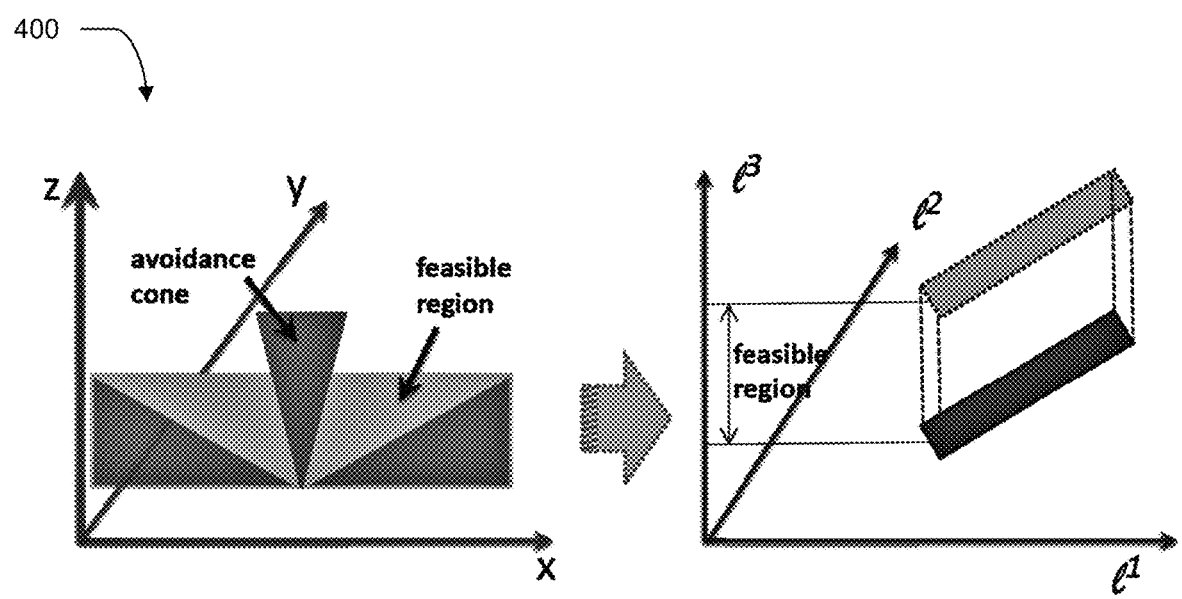
FIG. 4 illustrates production of a label space by mapping tasking variables (right) and constraints (left).

In a second step, (unique) integer values, 1, 2, ..., $N_v \in \mathbb{N}$ are arbitrarily assigned to the discrete vector. This second step assigns $N_v$ vertices to the UAV collection planning graph, see FIG. 1. Vertices of a collection planning graph are the set of tasks that should be properly sequenced in order to maximize the utility of a mission. The real variables associated with the remainder of the categorical variables can be grouped into a) parameters, b) variables, and c) constraints on variables. For example, in equation 3, the parameters are the latitude $l_c^1$, longitude $l_c^2$, and orientation angle $\theta$ of the strip (see FIG. 3), the variables are latitude $l^1$ and longitude $l^2$, and the area is part of the totality of constraints on the permissible values of the latitude and longitude to perform the task associated with the strip. Consequently, $l=(l^1,l^2)\in \mathbb{R}^2$ can be set as the label-space variable. Because the task is to collect such that elevation angle is required to be over 30° and below 75°, a three-dimensional label space ($\mathbb{R}^3$) with $l^3$ as the elevation angle is defined (see FIG. 4).

Figure 5:
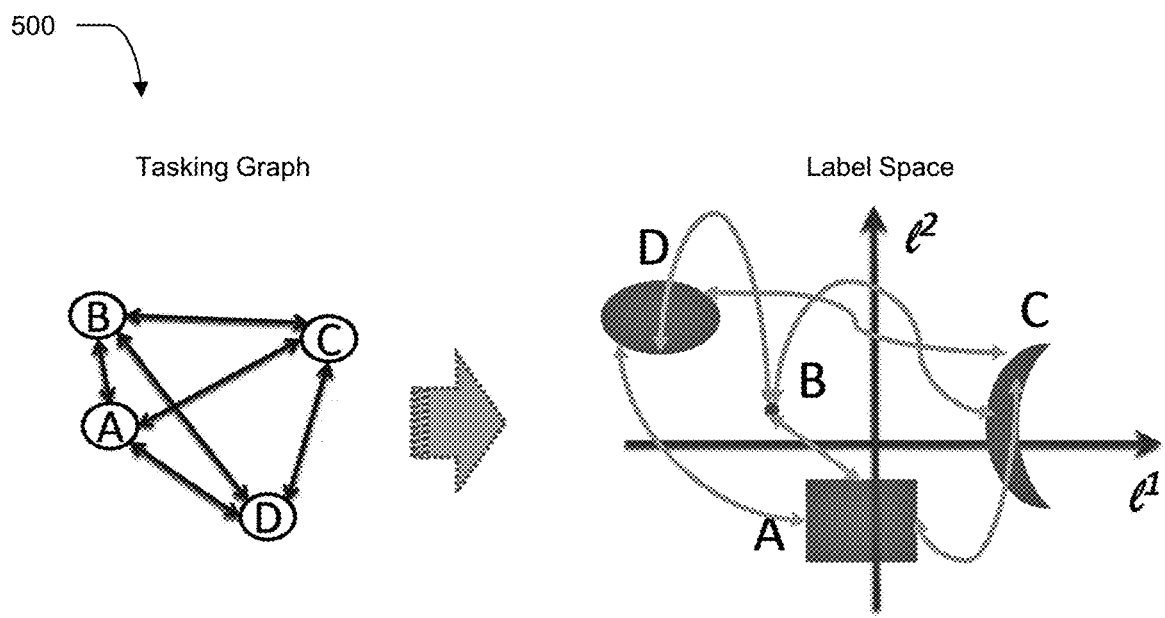
FIG. 5 illustrates mapping a tasking graph to its label space representation.

In a third step, a set $\mathbb{L}_i \subset \mathbb{R}^{N_1}$ is associated to each vertex $i \in \mathcal{N}_v := \{1, 2, \ldots, N_v\}$. Each set $\mathbb{L}_i$ constitutes the totality of all constraints associated with vertex i. The arcs of the tasking graph can be represented by label-space trajectory segments as illustrated in FIG. 5. Thus, a continuous label-space trajectory represents a tasking sequence otherwise known as a walk in the graph. The abstract form $\mathbb{L}_i$ is used for the representation of vertex i in $\mathbb{R}^{N_1}$. In one embodiment of the invention, an $\mathbb{L}_i$ set must be represented in the form of function equalities and/or inequalities. For example, assuming $N_1=2$ in FIG. 5, $\mathbb{L}_B$ is given by equation 6, $$\mathbb{L}_B = \{(l^1, l^2) \in \mathbb{R}^2 : l^1 - l_B^1 = 0, l^2 - l_B^2 = 0\} \quad (6)$$

where $(l_B^1, l_B^2)$ are the specified coordinates of B in $\mathbb{R}^2$. The strip in FIG. 3 along with the imaging constraint condition illustrated in FIG. 4 can be represented in the form of function inequalities, $$\mathbb{L}_{strip} = \{l := (l_2, l^3) \in \mathbb{R}^2 \times \mathbb{R} : Al \leq 0, 30.0° \leq l^3 \leq 75.0°\}$$

where A is a 4×2 coefficient matrix that helps locate the four edges of the strip. Thus, given a UAV collection tasking problem as illustrated in FIG. 2, an $N_1$-dimensional real-valued label space representation of its task vertices can be generated.

Figure 6:
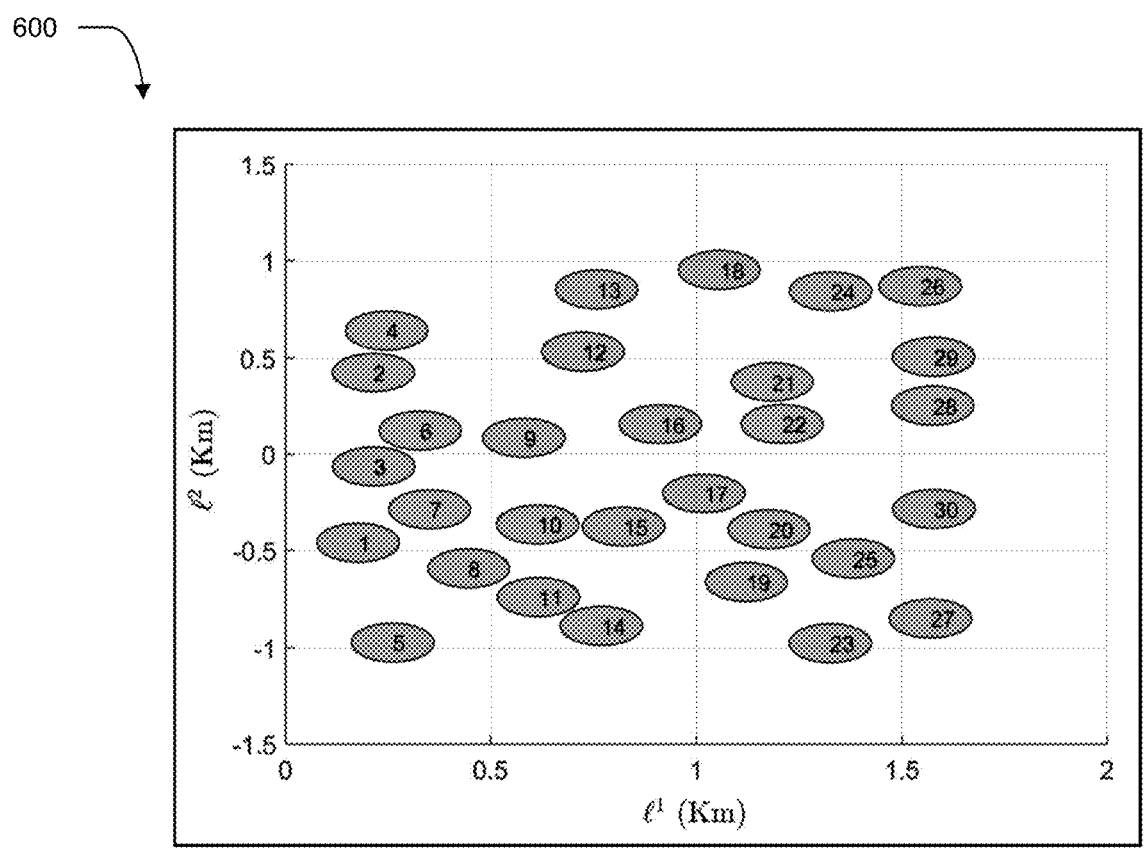
FIG. 6 illustrates a random set of 30 point-area imaging spots of diameter 0.2 Km.

For the purposes of numerical illustration of the present invention, a random set of 30 circular point-areas of diameter 0.2 km is generated as shown in FIG. 6. If there are no other constraints on the point-areas, the label space constraints for each vertex is given quite simply by equation 7, $$\mathbb{L}_i = \{l \in \mathbb{R}^2 : \|l - l_{c_i}\|_2^2 \leq 0.01\} \quad (7)$$

where, $l \in \mathbb{R}^2$ are the x- and y-points on the ground. The randomly generated locations of the center of the targets $l_{c_i}$ are given in Table 1.

TABLE 1

Locations of randomly chosen centers of point-area spots shown in FIG. 6.

| ID No | $l_c^1$ | $l_c^2$ |
|---|---|---|
| 1 | 0.17688 | −0.46091 |
| 2 | 0.21437 | 0.42142 |
| 3 | 0.21493 | −0.06526 |
| 4 | 0.24648 | 0.63918 |
| 5 | 0.26107 | −0.97545 |
| 6 | 0.32794 | 0.11967 |
| 7 | 0.35167 | −0.28932 |

TABLE 1-continued

Locations of randomly chosen centers of point-area spots shown in FIG. 6.

| ID No | $l_c^1$ | $l_c^2$ |
|---|---|---|
| 8 | 0.44629 | −0.59283 |
| 9 | 0.58119 | 0.08273 |
| 10 | 0.61460 | −0.36728 |
| 11 | 0.61669 | −0.74132 |
| 12 | 0.72450 | 0.53033 |
| 13 | 0.75788 | 0.85194 |
| 14 | 0.76949 | −0.88947 |
| 15 | 0.82333 | −0.37810 |
| 16 | 0.91266 | 0.15307 |
| 17 | 1.01836 | −0.20577 |
| 18 | 1.05605 | 0.95146 |
| 19 | 1.12200 | −0.66362 |
| 20 | 1.17707 | −0.39159 |
| 21 | 1.18473 | 0.37279 |
| 22 | 1.20911 | 0.15392 |
| 23 | 1.32677 | −0.97872 |
| 24 | 1.32755 | 0.84148 |
| 25 | 1.38258 | −0.54257 |
| 26 | 1.54510 | 0.86843 |
| 27 | 1.56996 | −0.85140 |
| 28 | 1.57562 | 0.24849 |
| 29 | 1.57771 | 0.50370 |
| 30 | 1.57865 | −0.28736 |

3. Label Space to State-Space Transformational Equations

Figure 7:
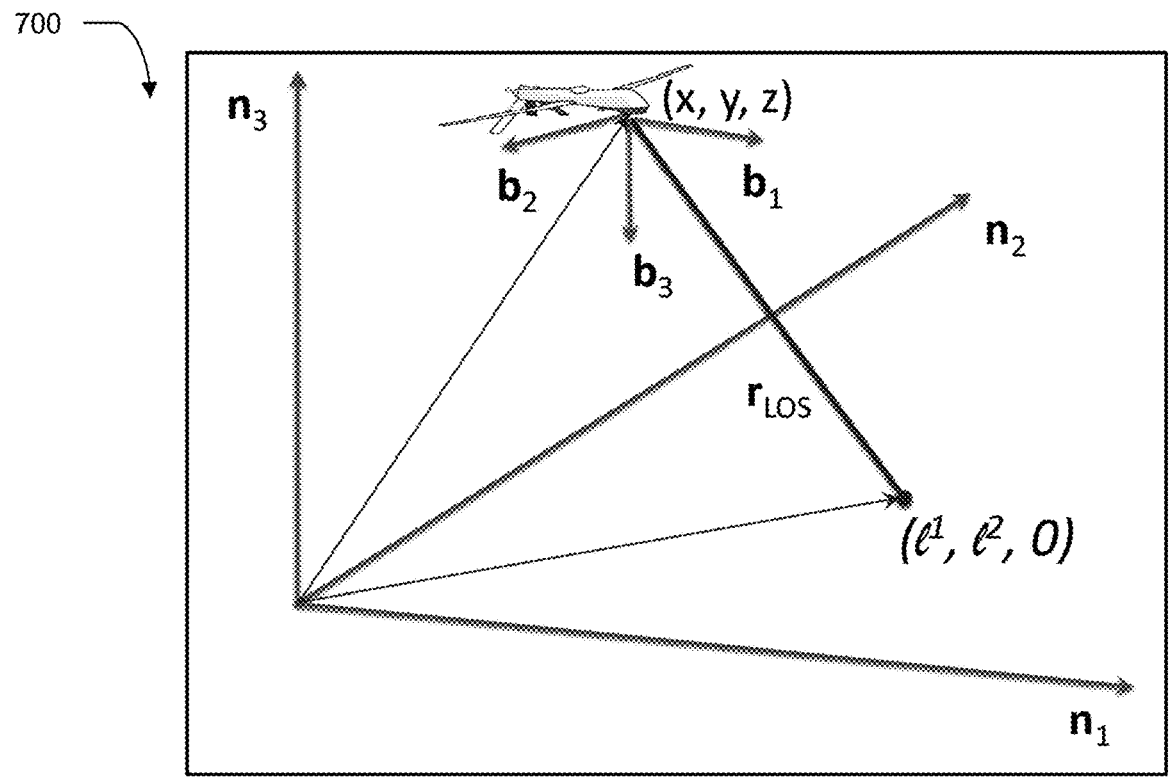
FIG. 7 is a schematic for connecting the state space of a UAV to a label space.

In one embodiment, a state vector for the UAV payload can be defined in terms of the position and velocity of the point about which the camera rotates, i.e., gimbals. The orientation parameters and angular velocity of the camera mounts complete the state vector representation. Thus, it can be seen that the state vector is not an element of the label space defined in Section 2. For the problem formulation to be meaningful, the state- and label-space vectors must be related in some manner. To develop general transformational equations that support this concept, the first five elements of the state variable are organized according to equation 8, $$\begin{pmatrix} x_1 \\ x_2 \\ x_3 \\ x_4 \\ x_5 \end{pmatrix} = \begin{pmatrix} \phi \\ \theta \\ x \\ y \\ z \end{pmatrix} \quad (8)$$

where, $\phi$ and $\theta$ are the pan and tilt angles of the camera respectively, and x, y and z are the position coordinates of the camera mount. Let $r_{LOS}$ be the vector from the camera to a generic point on the ground $(l^1, l^2, 0)$ (see FIG. 7).

From the triangle relationship between the indicated vectors equation 9 is obtained as, $$\begin{pmatrix} x \\ y \\ z \end{pmatrix} + r_{LOS} = \begin{pmatrix} l^1 \\ l^2 \\ 0 \end{pmatrix} \quad (9)$$

Figure 8:
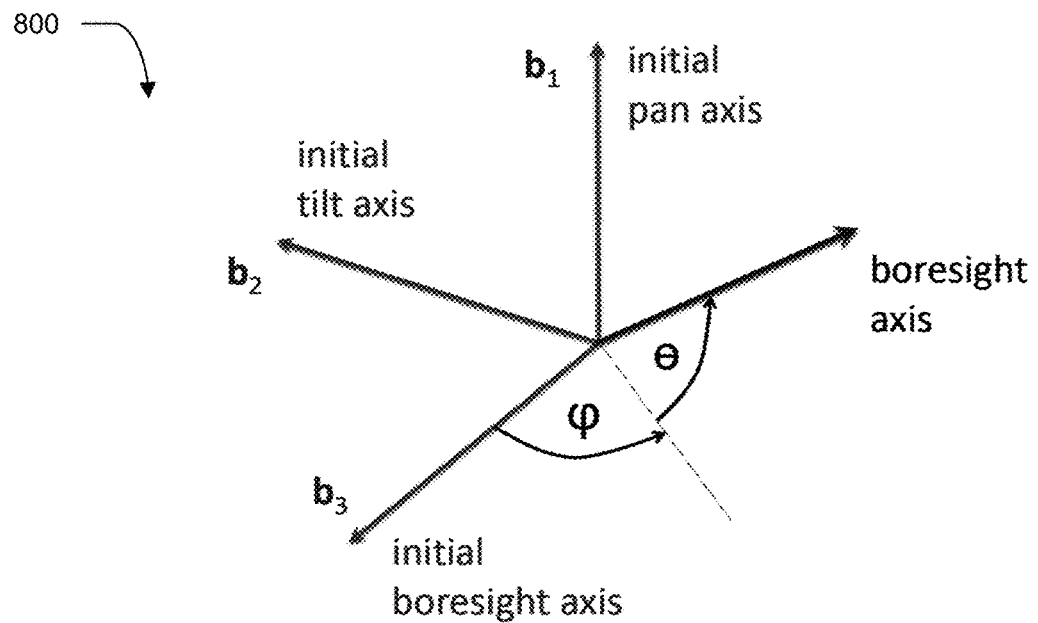
FIG. 8 illustrates pan and tilt angles of a camera boresight relative to a UAV-fixed frame.

From the elementary kinematics illustrated in FIG. 8, equation 10 is obtained as, $$\frac{r_{LOS}}{r_{LOS}} = (\sin\theta)b_1 - (\sin\phi\cos\theta)b_2 + (\cos\phi\cos\theta)b_3 \quad (10)$$

$$= (\sin\theta)n_1 + (\sin\phi\cos\theta)n_2 - (\cos\phi\cos\theta)n_3$$

where, $r_{LOS}$ is the magnitude (2-norm) of $r_{LOS}$. Substituting equation 10 in equation 9 results in equation 11, $$x + r_{LOS} \sin \theta = l^1$$

$$y + r_{LOS} \sin \phi \cos \theta = l^2$$

$$z - r_{LOS} \cos \phi \cos \theta = 0 \quad (11)$$

Manipulating equation 11 to eliminate $r_{LOS}$ equation 11 reduces to equation 12, $$x + z \tan \delta/\cos \phi = l^1$$

$$y + z \tan \phi = l^2 \quad (12)$$

From equation 8, it can be seen that equation 12 is of the form shown in equation 13, $$l = L(x) \quad (13)$$

where, L: $x \mapsto l$ is an equation designed by an operator of the process that maps a state vector x to a label vector l. In certain problems, it may not be easy to generate an explicit function L. In this case, a more practical state-to-label-space transformational model is given implicitly by the zeros of some function g shown in equation 14, $$g(x,l) = 0 \quad (14)$$

where, $g:(x,l) \mapsto \mathbb{R}^{N_g}$, $N_g \in \mathbb{N}$. Equation 13 is included in equation 14 with $g(x,l) := L(x) - l$.

Note that equation 12 was possible because equation 11 was manipulated to explicitly eliminate $r_{LOS}$ in equation 11. In certain problems, it may not be possible or even practical to perform such elimination of variables. In such situations, it is more convenient to introduce additional control parameters as part of the totality of control variables $u \in \mathbb{R}^{N_u}$ so that equation 14 can be further generalized to equation 15, $$g(x,l,u,t) = 0 \quad (15)$$

where, also incorporated in g is an explicit dependence on time. The explicit time-dependence of g is quite critical in practical applications. Thus, for this UAV collection tasking, no further effort need be expended past equation 11 by setting $r_{LOS} = u \in \mathbb{R}$.

In the application of the method of the invention, it is inadvisable to set $r_{LOS} = u \in \mathbb{R}^3$ and simply use equation 9. This is because $r_{LOS}$ is functionally dependent on $\phi$ and $\theta$ which were declared to be part of the state variables. In optimal control theory, controls are mathematical variables that do not have time rate (i.e., du/dt) constraints.

4. Atomic Functions and Functionals

From Section 3, it follows that a label-space trajectory $t \mapsto l$ can be associated with a state-space trajectory $t \mapsto x$ and vice versa. Let $\mathbb{L}_a \subset \mathbb{L}^{N_l}$ denote the label-space representation of an arbitrary vertex a. Note that $\mathbb{L}_a$ is allowed to be a point with nonzero measure (see equation 6). In most practical applications $\mathbb{L}_a$ is a non-atomic subset of $\mathbb{R}^{N_l}$; herein functions and functionals developed for a single vertex are referred to as atomic. In Section 5, these atomic quantities are used to develop payoff functionals that are used to describe the value derived by an entire optimal trajectory path tasking sequence over the entire graph.

Figure 9:
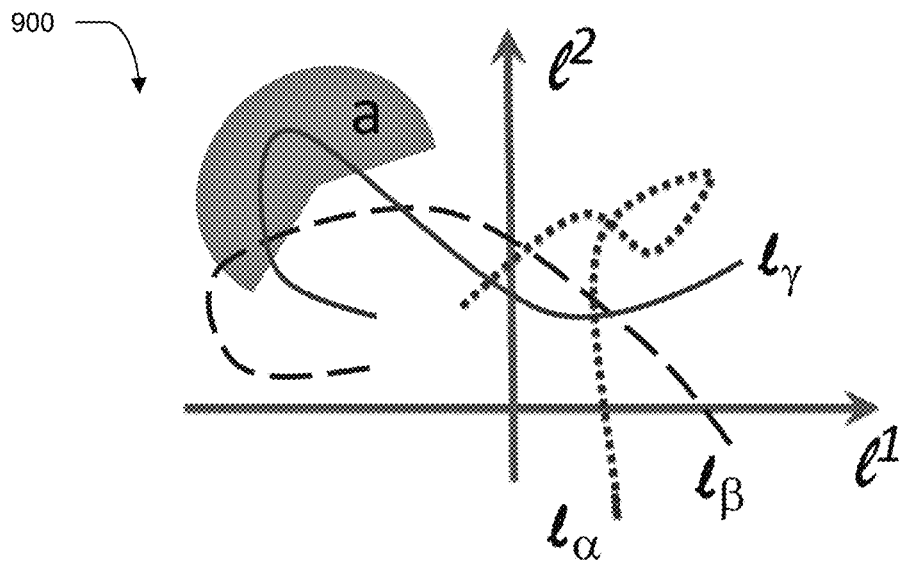
FIG. 9 is a label-space representation of a generic vertex a and candidate label-space trajectories.

For illustration, three candidate label-space trajectories in $\mathbb{R}^{N_l}$ are shown in FIG. 9. Because the label-space trajectory $t \mapsto l_\alpha$ does not intersect $\mathbb{L}_a$, it can be concluded that Task a (associated with vertex a) was not performed. Note also that by equations (13), (14) or (15) which relate the label-space trajectory to a state-space trajectory, that the label-space trajectory $t \mapsto l_\alpha$ does not intersect means that the state-space trajectory of the UAV is such that Task a cannot be executed. In the case of label-space trajectories $t \mapsto l_\beta$ and $t \mapsto l_\gamma$, it can be concluded that an attempt was made to perform Task a because label-space trajectories $t \mapsto l_\beta$ and $t \mapsto l_\gamma$, intersect the area labeled 'a' in FIG. 9. As above by equations (13), (14) or (15), which relate the label-space trajectory to a state-space trajectory, that label-space trajectories $t \mapsto l_\beta$ and $t \mapsto l_\gamma$, do intersect means that the state-space trajectory of the UAV is such that Task a may be executed and where each of label-space trajectories $t \mapsto l_\beta$ and $t \mapsto l_\gamma$, may provide the same or a different value for performing Task a. In order to mathematically quantify the interaction of any label-space trajectory and a Task a, a Kronecker indicator function of $\mathbb{L}_a$ defined by equation 16 is introduced, $$\mathcal{I}(l, \mathbb{L}_a) := \begin{cases} 1 & \text{if } l \in \mathbb{L}_a \\ 0 & \text{if } l \notin \mathbb{L}_a \end{cases} \quad (16)$$

Equation (16) means that if a label-space trajectory l intersects a set, a value of 1 is returned; whereas if a label-space trajectory l does not intersect a set, a value of 0 is returned.

The time-on-task functional $T_a$: $l(\cdot) \mapsto \mathbb{R}$, meaning the time spent performing task $T_a$, is a mapping from an entire label-space trajectory to a real scalar number, and the time spent performing task $T_a$ is defined by equation 17, $$T_a[l(\cdot)] := \int_{t_0}^{t_f} \mathcal{I}(l(t), \mathbb{L}_a) dt \quad (17)$$

where, $t_0$ and $t_f$ are clock times of interest with $t_f > t_0$. That is, the integration of the total time that a label-space trajectory intersects a set is a mapping to the total time that has been spent performing Task a. Applying equation 16 and equation 17 to the trajectories shown in FIG. 9, $T_a[l_\alpha(\cdot)] = 0$ while $T_a[l_\beta(\cdot)]$ and $T_a[l_\gamma(\cdot)]$ are both not zero. The quantities $T_a[l_\beta(\cdot)]$ and $T_a[l_\gamma(\cdot)]$ measure the time expended to perform Task a by $l_\beta(\cdot)$ and $l_\gamma(\cdot)$ respectively.

In a scheduling problem, performing a task may be time-sensitive or time-critical. Let $t_a^w := [t_a^{start}, t_a^{end}]$ be a given time window of opportunity for performing Task a successfully, with $t_a^{start} \in [t_0, t_f]$, $t_a^{end} \in [t_0, t_f]$ and $(t_a^{end} - t_a^{start}) > 0$. A time-sensitive Kronecker indicator function of $\mathbb{L}_a$ can now be defined as equation 18, $$\mathcal{I}(l, \mathbb{L}_a(t); t, t_a^w) := \begin{cases} 1 & \text{if } l \in \mathbb{L}_a(t) \text{ and } t \in t_a^w \\ 0 & \text{otherwise} \end{cases} \quad (18)$$

Note that equation 18 also allows $\mathbb{L}_a$ to vary with respect to time. This is done not merely for the sake of greater mathematical generality; rather, such a model is quite crucial for aerospace applications. If equation 18 is substituted for the integrand in equation 17, the result is still equal to the time expended to perform Task a. This time, however, $T_a[l(\cdot)]$ returns a value of zero if the task is executed outside the time window, $t_a^w$.

It is quite possible that the performance of Task a may depend upon the shape of the label-space trajectory during the time when $l(t) \in \mathbb{L}_a(t)$. This simply means that different label-space trajectories, and therefore different state-space trajectories, x, can cause a Task a to be performed differently even when each different label-space trajectory intersects a set. As a means to model the performance of Task a, i.e., a task performance, a return function $R_a: (l, \mathbb{L}_a(t); t, t_a^w) \mapsto \mathbb{R}_{\geq 0}$ is defined as equation 19, $$R_a(l, \mathbb{L}_a(t); t, t_a^w) \begin{cases} \geq 0 & \text{if } l \in \mathbb{L}_a(t) \text{ and } t \in t_a^w \\ = 0 & \text{otherwise} \end{cases} \quad (19)$$

where, $$\int_{supp(R_a)} R_a(l, \mathbb{L}_a(t); t, t_a^w) d\mu > 0 \quad (20)$$

and $\mu$ is a Lebesgue measure over $supp(R_a) := \mathbb{L}_a(t) \times t_a^w$. The return function is problem-specific and may also be task-specific as defined by an operator of the process. The performance of a label-space trajectory $l(\cdot)$ with respect to Task a may be determined by way of a functional $K_a: l(\cdot) \mapsto \mathbb{R}$ that is defined analogous to equation 17 by, $$K_a[l(\cdot)] := \int_{t_0}^{t_f} R_a(l(t), \mathbb{L}_a(t); t, t_a^w) dt \quad (21)$$

From equation 19 and equation 21 it follows that $K_a[l(\cdot)] \geq 0$. Note that if $R_a$ is chosen to be the indicator function given by (18), then, it implies that the performance of Task a is agnostic to the form of label-space trajectory when $l(t) \in \mathbb{L}_a$. In other words, for this latter case, it is sufficient that a label-space trajectory intersects a set and that the location of the intersection is inconsequential to the return value.

5. Development of Computational Formulas for Several Payoff Functionals

The triple $[t_0, t_f] \mapsto \mathbb{R}\ t \mapsto (l, x, u)$ is defined to be the system trajectory for the orienteering problem. That is, the triple comprises a system state trajectory, a label space trajectory, and a system control trajectory. Consequently, the arguments of a generic payoff functional P are given by $l(\cdot)$, $x(\cdot)$, $u(\cdot)$ and possibly the clock times, $t_0$ and $t_f$. A formula for the computation of a payoff functional depends upon the precise nature of the collection tasking problem to be solved. In this section, several exemplar formulas that depend upon the operational needs of the system are developed.

Let $R_i: (l, \mathbb{L}_i; t, t_i^w) \mapsto \mathbb{R}_{\geq 0}, i=1, 2, \ldots, N_v$ denote the return functions associated with the $N_v$ vertices of an orienteering problem. Motivated by the cost function in equation 1, a candidate payoff functional may be defined in terms of a summation of atomic returns given by equation 22, $$P[l(\cdot), x(\cdot), u(\cdot), t_0, t_f] := \sum_{i=1}^{N_v} \int_{t_0}^{t_f} R_i(l(t), \mathbb{L}_i(t); t, t_i^w) dt \quad (22)$$

Such a payoff functional has been used successfully to schedule ground station networks for satellite telemetry, data downlink and command, see for example, U.S. Pat. No. 10,476,584 to Minelli, et al. In other instances, it is quite possible that a task might be completed after a certain amount of return has been accumulated. For instance, if a satellite had a relatively small amount of data to downlink, then equation 22 is not an appropriate payoff functional. To model such payoff functionals, real variables $r_i$, $i=1, 2, \ldots, N$, are defined according to equation 23, $$r_i := \int_{t_0}^{t_f} R_i(l(t), \mathbb{L}_i(t); t, t_i^w) dt \quad (23)$$

Let $b_i \geq 0$, $i=1, 2, \ldots, N_v$ be nonnegative real numbers such that $r_i = b_i$ indicates the completion of Task i. Consequently, if $r_i$ is greater than $b_i$, the return on Task i is evaluated to be the same as when $r=b$. In order to model such valuations, an atomic return valuation function, $V_i^{ramp}: r_i \mapsto \mathbb{R}$, is defined according to equation 24, $$V_i^{ramp}(r_i; b_i) := \begin{cases} r_i & \text{if } r_i \leq b_i \\ b_i & \text{if } r_i \geq b_i \end{cases} \quad (24)$$

A payoff functional is then given by equation 25, $$P[l(\cdot), x(\cdot), u(\cdot), t_0, t_f] := \sum_{i=1}^{N_v} V_i^{ramp}(K_i[l(\cdot)]; b_i) \quad (25)$$

As a first remark, let $V_i^{linear}(r_i; \sigma_i) := \sigma_i r_i$ where $\sigma_i > 0$ is the score associated with the V. $i^{th}$ vertex, and $r_i$ is as defined in equation 23. Then equation 22 can be written in a more general form as equation 26, $$P[l(\cdot), x(\cdot), u(\cdot), t_0, t_f] := \sum_{i=1}^{N_v} V_i^{linear}(K_i[l(\cdot)]; \sigma_i) \quad (26)$$

That is, equation 22 is the same as equation 26 with $\sigma_i = 1$.

In a pure graph-theoretic problem formulation, the objective function of an orienteering problem is agnostic to the performance of a task. To produce a similar objective in the present framework, time-on-task real variables $\tau_i = 1, 2, \ldots, N_v$ real variables are defined according to equation 27, $$\tau_i := \int_{t_0}^{t_f} \mathcal{I}(l(t), \mathbb{L}_i(t); t, t_i^w) dt \quad (27)$$

Next, consider the atomic time-on-task evaluation function given by, $$V_i^{binary}(\tau_i) := 1 - \mathcal{I}(\tau_i, 0) := \begin{cases} 0 & \text{if } \tau_i = 0 \\ 1 & \text{if } \tau_i \neq 0 \end{cases} \quad (28)$$

A payoff functional that is analogous to the objective function in equation 1 is given by equation 29, $$P[l(\cdot), x(\cdot), u(\cdot), t_0, t_f] := \sum_{i=1}^{N_v} \sigma_i V_i^{binary}(T_i[l(\cdot)]) \quad (29)$$

In some situations it might be that a certain amount of time $\tau_i^{alloc} > 0$ is allocated to perform a Task i. That is, if less than $\tau_i^{alloc}$ time is expended in performing Task i, it is considered to be incomplete and valued at zero and greater amounts of time expenditure are not rewarded. A mathematical model for this evaluation is given by equation 30, $$V_i^{step}(\tau_i; \tau_i^{alloc}) := \text{step}(\tau_i, \tau_i^{alloc}) := \begin{cases} 1 & \text{if } \tau_i \geq \tau_i^{alloc} \\ 0 & \text{if } \tau_i < \tau_i^{alloc} \end{cases} \quad (30)$$

A payoff functional associated with the step valuation can then be written as equation 31, $$P[l(\bullet), x(\bullet), u(\bullet), t_0, t_f] := \sum_{i=1}^{N_v} \sigma_i V_i^{step}(T_i[l(\bullet)]; \tau_i^{alloc}) \quad (31)$$

As a second remark, the step function may also be used in conjunction with the return functional $K_i[l(\cdot)]$ and the parameter $b_i$ used in equation 25 to generate a new payoff functional shown as equation 32, $$P[l(\bullet), x(\bullet), u(\bullet), t_0, t_f] := \sum_{i=1}^{N_v} \sigma_i V_i^{step}(K_i[l(\cdot)]; b_i) \quad (32)$$

That is, in equation 32 no incremental reward is generated if $0 \leq K_i[l(\cdot)] < b_i$. Furthermore, new payoff functionals may be generated by using some heterogenous combinations of various atomic valuation functions.

As a third remark, it is apparent from equation 25, 26, 29, and 31 and the second remark that many practical payoff functionals may be modeled as functionals of functionals. As a fourth remark, let $J_i^k[l(\cdot)], k=1, 2, \ldots, m$ be a collection of $m$ generic functionals associated with each vertex $i$, and $J[l(\cdot)]$ be a matrix functional defined by, $$J[l(\cdot)] = \begin{bmatrix} J_1^1[l(\bullet)], & \ldots, & J_1^m[l(\bullet)] \\ J_2^1[l(\bullet)], & \ldots, & J_2^m[l(\bullet)] \\ \vdots & \vdots & \vdots \\ J_{N_v}^1[l(\bullet)], & \ldots, & J_{N_v}^m[l(\bullet)] \end{bmatrix}$$

Let $V: \mathbb{R}^{N_v} \times \mathbb{R}^m \mapsto \mathbb{R}_q \mapsto \mathbb{R}$ be a generic valuation function; then, a payoff functional for an orienteering problem may be defined in terms of a functional of a matrix functional given by, $$P[l(\cdot), x(\cdot)u(\cdot), t_0, t_f] := V(J[l(\cdot)])$$

Typically, $V: q \mapsto \mathbb{R}$ is a non-smooth function.

6. A Numerical Example Problem

As an example of the application of the method of the invention, consider the UAV collection tasking problem for the imaging data set defined in Table 1 and equation 7. As a means to illustrate many aspects of one embodiment, the UAV is set on a straight and level flight path along the $n_1$ direction and at a constant altitude of $z=h=500$ meters (see FIG. 7). Under this constraint, the only way to perform EO collections on collection targets is to pan and tilt the camera. Further, the speed of the UAV is set to be a constant value of $V_x=500$ meters per second. As a result, the specifics of equation 11 are now given by equation 33, $$x_0 + V_x(t-t_0) + r_{LOS} \sin \theta = l^1$$

$$y + r_{LOS} \sin \theta \cos \theta = l^2$$

$$h - r_{LOS} \cos \theta \cos \theta = 0 \quad (33)$$

where, $x_0$ is the x-position of the UAV at time $t_0$. Note that equation 33 is in the general form given by equation 15 where g depends explicitly on time and a control variable ($r_{LOS}$) in addition to state and label-space variables. The pan and tilt angles are state variables because their derivatives are constrained according to the kinematic equations, $$\dot{\phi} = \omega_\phi, \dot{\theta} = \omega_\theta \quad (34)$$

As part of modeling the area of regard (see FIG. 2), the angular limits of $\theta$ and $\theta$ are constrained by, $$-75° \leq \phi \leq 75°, -70° \leq \theta \leq 70° \quad (35)$$

Because of practical limits on the gimbal rates and torques, the equations are set as, $$\dot{\omega}_\phi = u_\phi, -10 \leq \omega_\phi \leq 10, -3 \leq u_\phi \leq 3$$

$$\dot{\omega}\theta = u\theta, -10 \leq \omega\theta \leq 10, -3 \leq u\theta \leq 3 \quad (36)$$

The control variables for the problem are now defined by, $$u := (r_{LOS}, u_\phi, u_\theta) \in \mathbb{U} \subset \mathbb{R}^3 \quad (37)$$

where, $\mathbb{R}$ is a bounded set implied in equations 36. The state variables are, $$x := (\phi, \theta, \omega_\phi, \omega_\theta) \in \mathbb{X} \in \mathbb{R}^4 \quad (38)$$

where, $\mathbb{X}$ is a compact set implied by equations 35 and 36. Furthermore, the entire label space $\mathbb{L}$ is limited to a strip, $$\mathbb{L} := \{(l^1, l^2) \in \mathbb{R}^2 : 0 \leq l^1 \leq 1.9 \text{ km}, -1.6 \leq l^2 \leq 1.6 \text{ km}\} \quad (39)$$

so that $l(t) \in \mathbb{L}, \forall t \in [t_0, t_f]$. It can be seen that this exemplar problem includes many of the myriad constraints discussed in Sections 1 and 3. Furthermore, additional constraints are introduced as given by, $$x \in \mathbb{X}, u \in \mathbb{U}, \text{ and } l \in \mathbb{L}$$

For the example payoff functional, equation 31 is selected with $\sigma=1$ and $t_i^{alloc}=2$ seconds for all $i=1, \ldots, 30$. That is, all tasks are valued equally and the camera is required to dwell over an imaging spot for a minimum of two seconds to be of any value.

6A. Overview of a Numerical Implementation

All the constraint functions in equations 33-39 are smooth. Non-smoothness in this particular problem formulation is only in the computation of the payoff functional given by equation 40, $$P[l(\bullet), x(\bullet), u(\bullet)] = \sum_{i=1}^{30} V_i^{step}(T_i[l(\bullet)]; 2) \quad (40)$$

where, $$V_i^{step}(T_i[l(\bullet)]; 2) = \begin{cases} 1 & \text{if } \int_{t_0}^{t_f} \mathcal{I}(l(t), \mathbb{L}_i) dt \geq 2 \\ 0 & \text{if } \int_{t_0}^{t_f} \mathcal{I}(l(t), \mathbb{L}_i) dt < 2 \end{cases} \quad (41)$$

and $\mathbb{L}$, are as given in equation 7 and Table 1. The summation element in equation 40 is smooth; hence, the non-smoothness in the computation of the payoff functional is entirely in the atomic valuation function given equation 41. To indicate its computational elements, the right-hand-side of equation 41 is written by the integral representation of the time-on-task functional $T_i[l(\cdot)]$. Because integrals are well approximated by Gaussian quadrature rules, it can be seen that a natural and efficient choice for the computation of the right-hand-side of equation 41 is through the use of Legendre-Gauss-Lobatto (LGL) points. A quadrature that employs Clenshaw-Curtis weights over Chebyshev-Gauss-Lobatto (CGL) points is also competitive to Gaussian formulas. Consequently, the use of Legendre or Chebyshev pseudospectral (PS) methods, which are well known to those of skill in the art, are efficient and a preferred way to solve the UAV collection tasking problem.

Using quadrature formulas to compute the right-hand-side of equation 41 produces challenges in PS methods because the indicator function is mostly equal to zero over the time interval $[t_0, t_f]$. To alleviate this problem, a nonlinear conformal mapping of the time-domain is desirable to produce a non-Gaussian clustering of the node distribution. Further, an implementation of equation 40 requires 30 (=quadratures per iteration. Consequently, it is important to not only use efficient quadrature formulas, it is also important to use formulas whose constituent elements can be computed efficiently. For instance, the quadrature points in the CGL formula are given in closed form (by the cosine function) but the LGL points are only given in terms of zeros of the derivatives of the Legendre polynomials. This indicates that the Chebyshev PS method may be advantageous in view of the competitive convergence rate of the Clenshaw-Curtis formula; however, in recent years, it has been possible to generate LGL points in O(1) computational time. Consequently, an advanced spectral implementation of a transformed Legendre or Chebyshev PS method can be effectively used for solving the UAV orienteering problem. Such an implementation is readily available via DIDO©—a MATLAB optimal control toolbox for solving optimal control problems. The numerical results described herein were generated through the use of this software, though an operator of the process may use any appropriate optimal control solver to execute the method.

Figure 10:
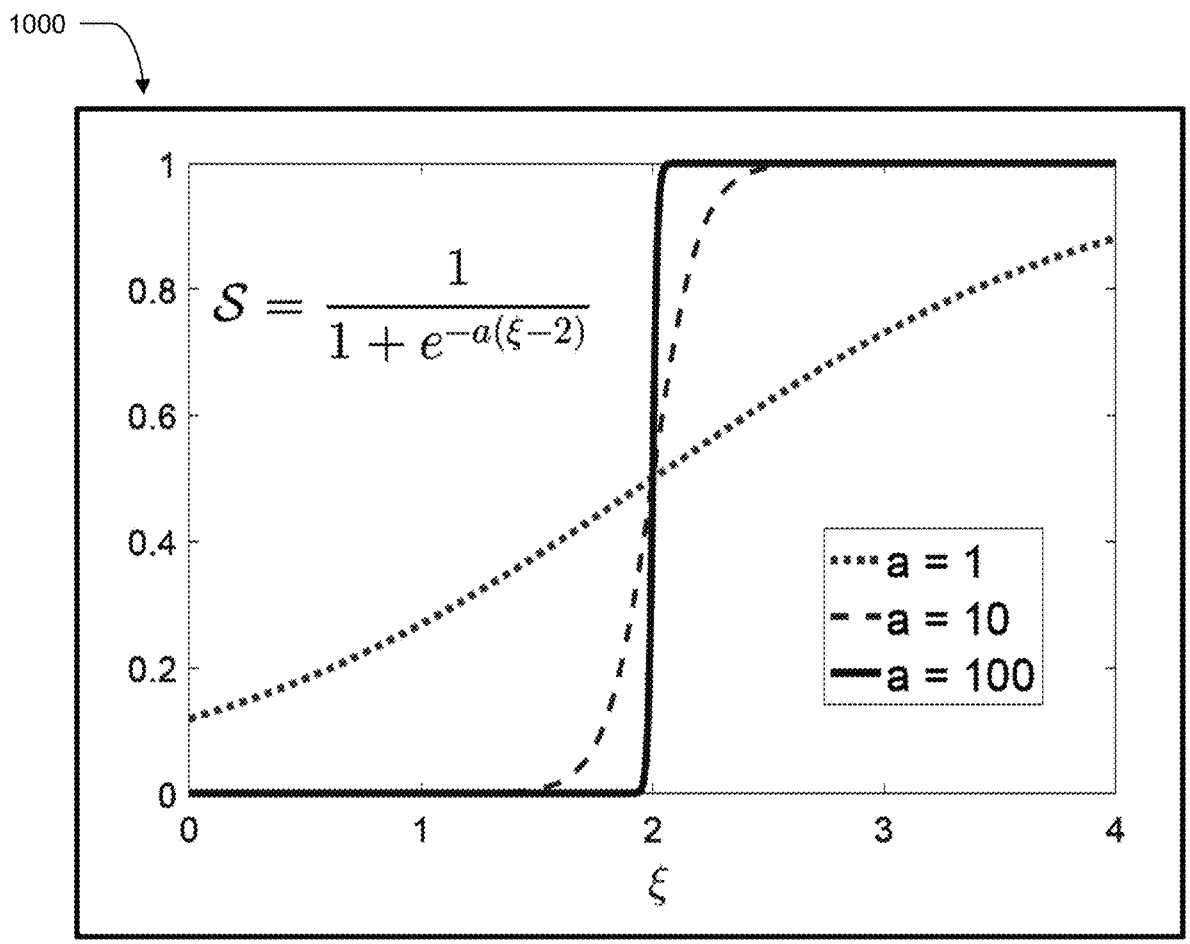

Many computational methods and software perform best when the problem formulation is prescribed in terms of differentiable functions. Consequently, the step function is approximated by a smooth sigmoid function shown in FIG. 10. By replacing the step function in the problem formulation by a smooth sigmoid function, a well-approximated smooth computational problem formulation is generated that can be solved via the spectral algorithm.

6B. Illustrative Results

Figure 11:
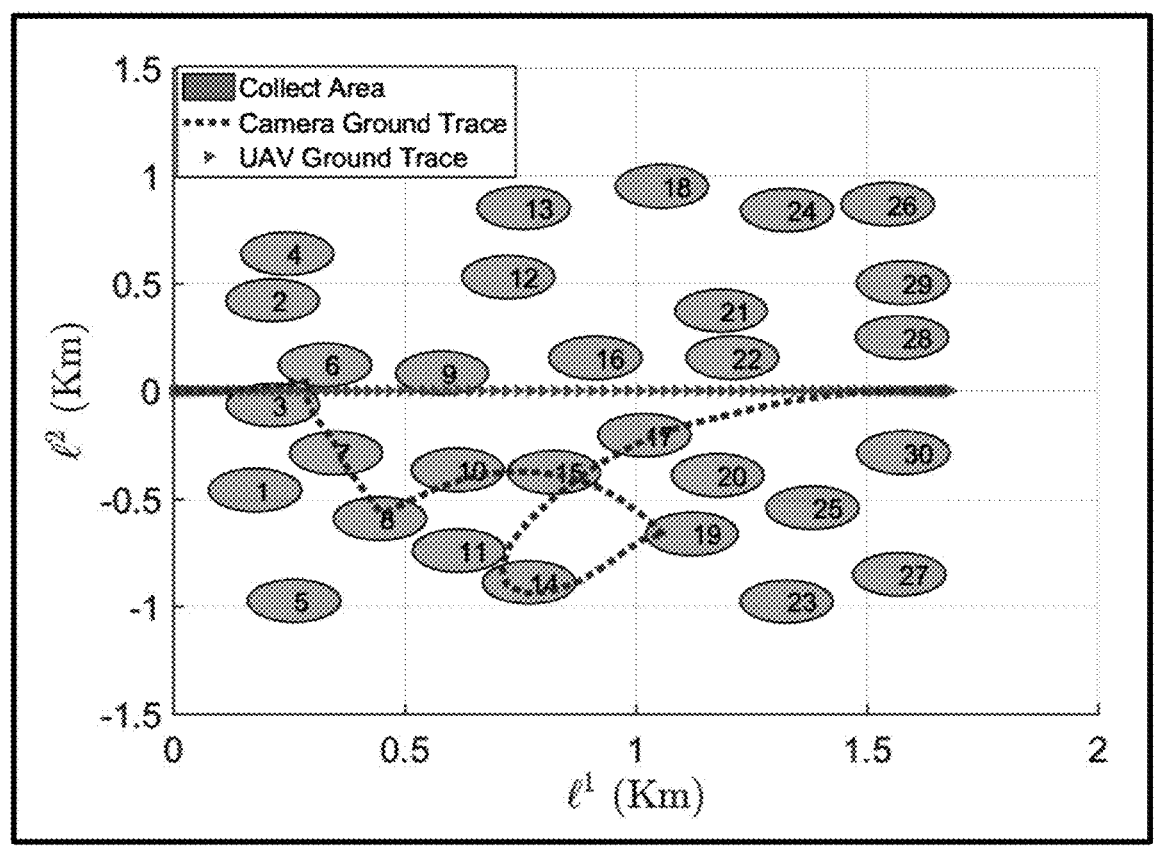
FIG. 11 illustrates an example optimal trajectory path tasking, illustrated in terms of the camera boresight ground trace, for a UAV collection tasking problem determined through an application of the invention.

A plot of the ground trace of a camera boresight (label-space trajectory in this particular instance) is shown in FIG. 11. This illustrative visual demonstrates the use of the method described herein generates a payload tasking solution to the collection problem. FIG. 11 suggests that two collections were performed over spots number 13 and 15. Recall from equation 41 that the payoff functional requires a minimum dwell time of 2 seconds to be of any value; hence, it is not entirely clear by a visual inspection of FIG. 11 if spots number 13 and 15 were indeed imaged twice. In fact, FIG. 11 does not contain any information to determine whether the traversed spots were indeed collected on per the requirements. To determine the actual sequence of successful collections, it is necessary to evaluate the integral of the indicator function over all spots, i=1, 2, . . . , 30 and only consider those that meet the requirement, $$\int_{t_0}^{t_f} \mathcal{I}(l(t), \mathbb{L}_i) dt \geq 2$$

Figure 12:
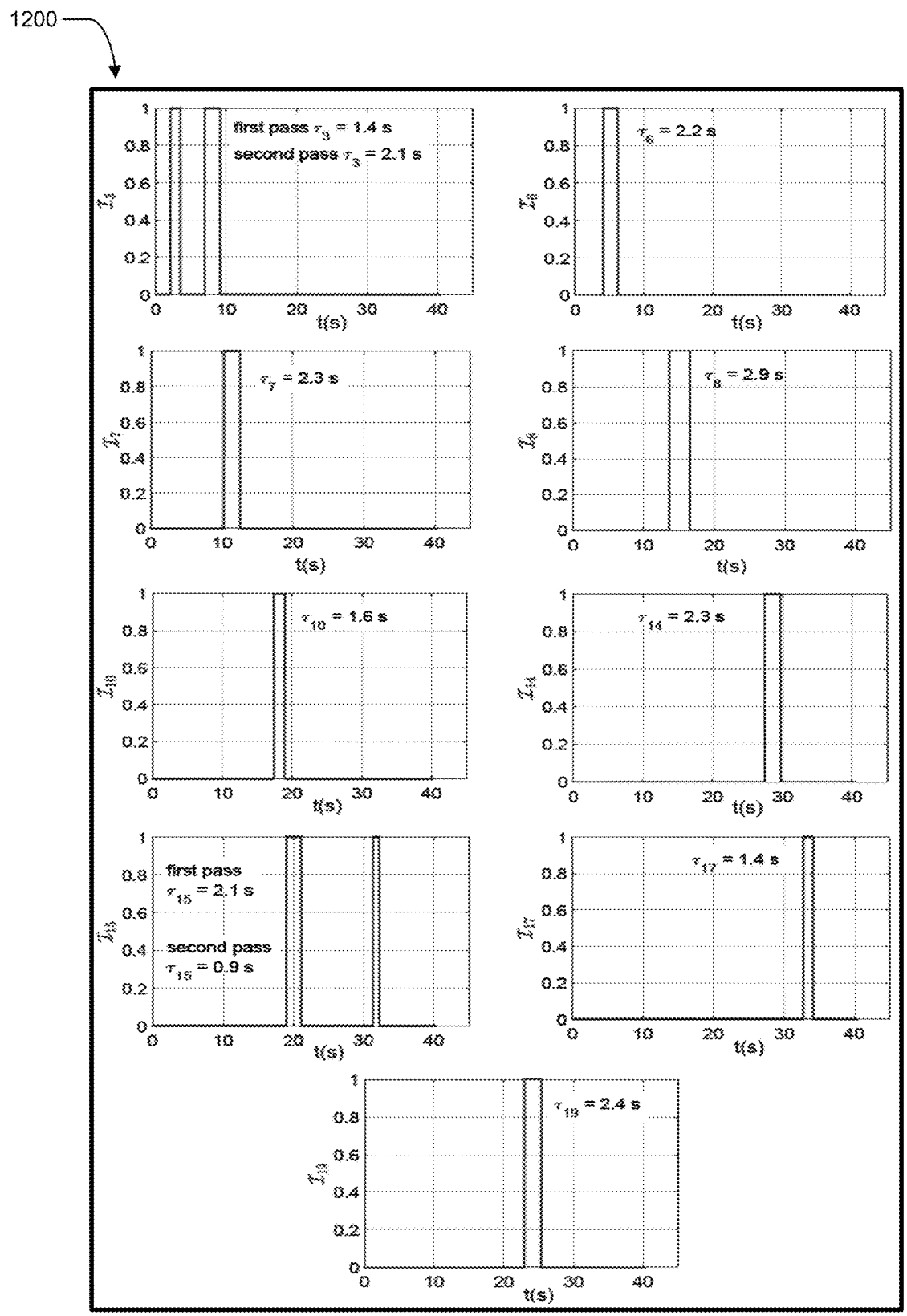
FIG. 12 illustrates example time-on-task indicator functions evaluated for the UAV optimal trajectory path tasking sequence shown in FIG. 11.

A plot of the indicator functions for which $T_i[l(\cdot)]>0$ are shown in FIG. 12. Examining these plots, the following can be noted: (1) the first point-area to be imaged is spot #6, not spot #3-spot #3 is simply in the way of the camera's first collect; (2) spot #3 is indeed imaged, however, it is imaged only during the camera's "second" pass; and (3) spot #10 and spot #17 are not imaged—these spots simply appear to be in the "line-of-sight" of the camera bore sight. Thus, the sequence of collects is given as spots 6, 3, 7, 8, 15, 19, and 14.

Embodiments in accordance with the invention utilize continuous-time equations as part of the fundamentals that govern the construction of an orienteering problem graph. The combinatorial variables associated with the graph are then imbedded as part of the continuous-time framework through the use of a variety of non-smooth functions. The numerical embodiments described herein demonstrate that the computational challenges can be successfully addressed through the use of advanced pseudospectral methods and smoothing techniques.

In accordance with the above description of the invention, a method and system for generating an optimal trajectory path tasking for a UAV is now described with reference to FIGS. 13 and 14.

Figure 13:
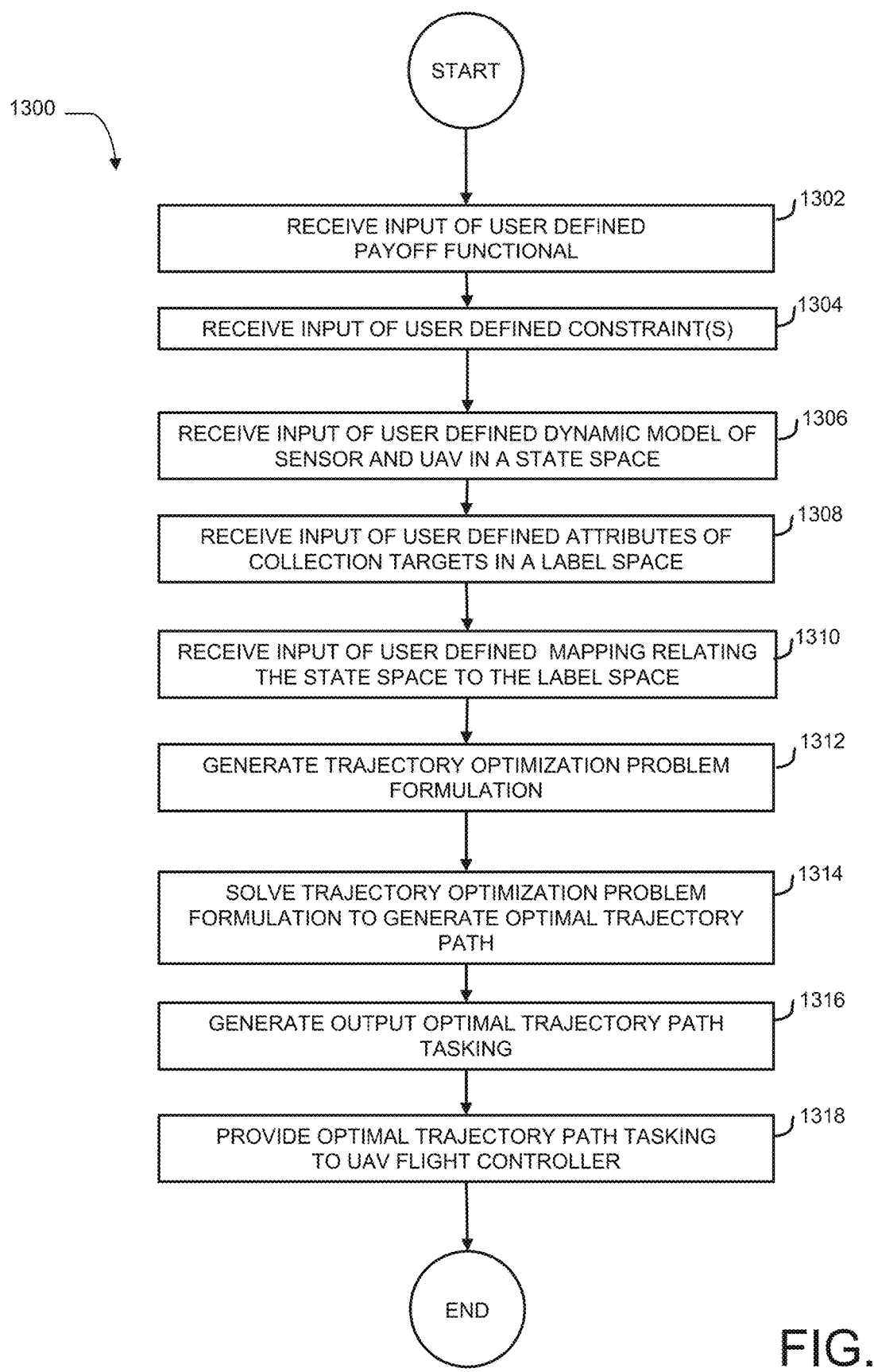
FIG. 13 illustrates a method for generating an optimal trajectory path tasking for a UAV for collection of data on one or more collection targets in accordance with one embodiment of the invention.

FIG. 13 illustrates a method 1300 for generating an optimal trajectory path tasking for an unmanned aerial vehicle (UAV) for collection of data on one or more collection targets by a sensor on the UAV in accordance with one embodiment of the invention.

In OPERATION 1302 RECEIVE INPUT OF USER DEFINED PAYOFF FUNCTIONAL, a user defined payoff functional input by a user is received. In the current embodiment, the payoff functional is defined by a user to maximize a selected objective for a UAV payload tasking. As earlier described, an example of a payoff functional is equation 22 that is defined in terms of a summation of atomic returns, $$P[l(\bullet), x(\bullet), u(\bullet), t_0, t_f] := \sum_{i=1}^{N_V} \int_{t_0}^{t_f} R_i(l(t), \mathbb{L}_i(t); t, t_i^v) dt$$

An example of performing equation 22 was described with reference to the descriptions of equations 23-32.

In OPERATION 1304 RECEIVE INPUT OF USER DEFINED CONSTRAINT(S), one or more user defined constraints input by a user are received. As earlier described, example constraints on the UAV tasking include constraints, such as operational and engineering constraints. For example, maximum and minimum pan and tilt angles and/or rates of the sensor, maximum and minimum airspeeds of the UAV, or maximum and minimum altitudes of the UAV. Equation 35 provided an example of engineering constraints on pan and tilt angles of a sensor, and equation 36 gave an example of the movement of the pan and tilt of a sensor. Equation 39 provided an example of an operational constraint as a view area constraint.

In OPERATION 1306 RECEIVE INPUT OF USER DEFINED DYNAMIC MODEL OF SENSOR AND UAV IN A STATE SPACE, a user defined state space and state-space model input by a user is received. As earlier described, an example of a state-space model of a UAV is given by, $$\begin{bmatrix} \dot{x} \\ \dot{y} \\ \dot{z} \\ \dot{\theta} \\ \dot{\phi} \end{bmatrix} = \begin{bmatrix} V\cos(\psi) \\ V\sin(\psi) \\ 0 \\ \omega_\theta \\ \omega_\phi \end{bmatrix}$$

where x, y, z are position coordinates with respect to an inertial reference frame, and $\theta$ and $\phi$ are gimbal angles of a sensor mounted to the UAV. A vector $[x,y,z,\theta,\phi]$ is a state space for the UAV model. V is a velocity over ground and $\psi$ is a heading angle, and these are considered as fixed parameters in the present embodiment. In other embodiments, the velocity over ground and/or the heading angle may change as a function of time or be described in terms of an alternative state space model. Variables $\omega_\theta$ and $\omega_\phi$ are gimbal angle rates and are considered as example control variables to be optimized.

In OPERATION 1308 RECEIVE INPUT OF USER DEFINED ATTRIBUTES OF COLLECTION TARGETS IN A LABEL SPACE, user defined attributes of collection targets in a label space input by a user are received. Examples of attributes of collection targets include, number of collection targets, collection target values, and dwell time on each collection target. As earlier described, a label space needs to be developed from an underlying space of categorial variables. An example of a label space is equation 7, $$\mathbb{L}_i = \{l \in \mathbb{R}^2 : \|l - l_{c_i}\|_2^2 \leq 0.01\}$$

In OPERATION 1310 RECEIVE INPUT OF USER DEFINED MAPPING RELATING THE STATE SPACE TO THE LABEL SPACE, a user defined mapping relating the state space to the label space input by a user is received. As earlier described, a mapping is defined which relates the state space defined in OPERATION 1306 to the label space defined in OPERATION 1308. Examples of mapping which relate the state space to the label space are described with reference to Equations 8, 9, 10, 11, and 12 and reference to FIGS. 7 and 8. Generally viewed, the mapping relates where the UAV is located (state space) to where the UAV sensor is imaging (label space).

In OPERATION 1312 GENERATE TRAJECTORY OPTIMIZATION PROBLEM FORMULATION, a trajectory optimization problem formulation is generated using the payoff functional defined in operation 1302, the constraints defined in operation 1304, and the mapping defined in operation 1310. One embodiment of a trajectory optimization problem for maximizing the value of a mission plan is given as, $$\begin{cases} \text{Maximize} & P[l(\cdot), x(\cdot), u(\cdot), t_0, t_f] = V(l(\cdot)) \\ \text{Subject to} & \dot{x} = f(x(t), u(t), t) \\ & g(x(t), l(t)) = 0 \\ & (x_0, t_0) \in \mathbb{E}^0 \\ & h(x(t), u(t), t) \leq 0 \\ & t_0 < t_f \leq t_f^U < \infty \end{cases}$$

In OPERATION 1314 SOLVE TRAJECTORY OPTIMIZATION PROBLEM FORMULATION TO GENERATE OPTIMAL TRAJECTORY PATH, the trajectory optimization problem is solved based on the user defined inputs to generate an optimal trajectory path. For example, the use of Legendre or Chebyshev pseudospectral (PS) methods can be used to solve the trajectory optimization problem formulation to generate an optimal trajectory path.

In OPERATION 1316 GENERATE OUTPUT OF OPTIMAL TRAJECTORY PATH TASKING, an optimal trajectory path tasking is generated based on an optimal trajectory path obtained from solving a trajectory optimization problem formulation solved in OPERATION 1314. For example, the actual sequence of successful collections (tasks) can be determined by evaluating the integrals of indicator functions over all tasks (as described in the numerical example) and considering, in sequence, only those that meet the task requirement. A generated optimal trajectory path tasking provides a mission trajectory and a mission plan for execution of a collection task which defines a sequence of collection targets that maximize a payoff functional. For example, an optimal trajectory path tasking can be generated as one or more command inputs executable by a UAV flight controller or other guidance system.

In OPERATION 1318 PROVIDE OPTIMAL TRAJECTORY PATH TASKING TO FLIGHT CONTROLLER OF THE UAV, an optimal trajectory path tasking output in operation 1316 is provided to a flight controller of the UAV, for example as a command vector input or series of inputs, allowing the UAV to provide optimized collection among the collection targets in accordance with the optimal trajectory path tasking.

Figure 14:
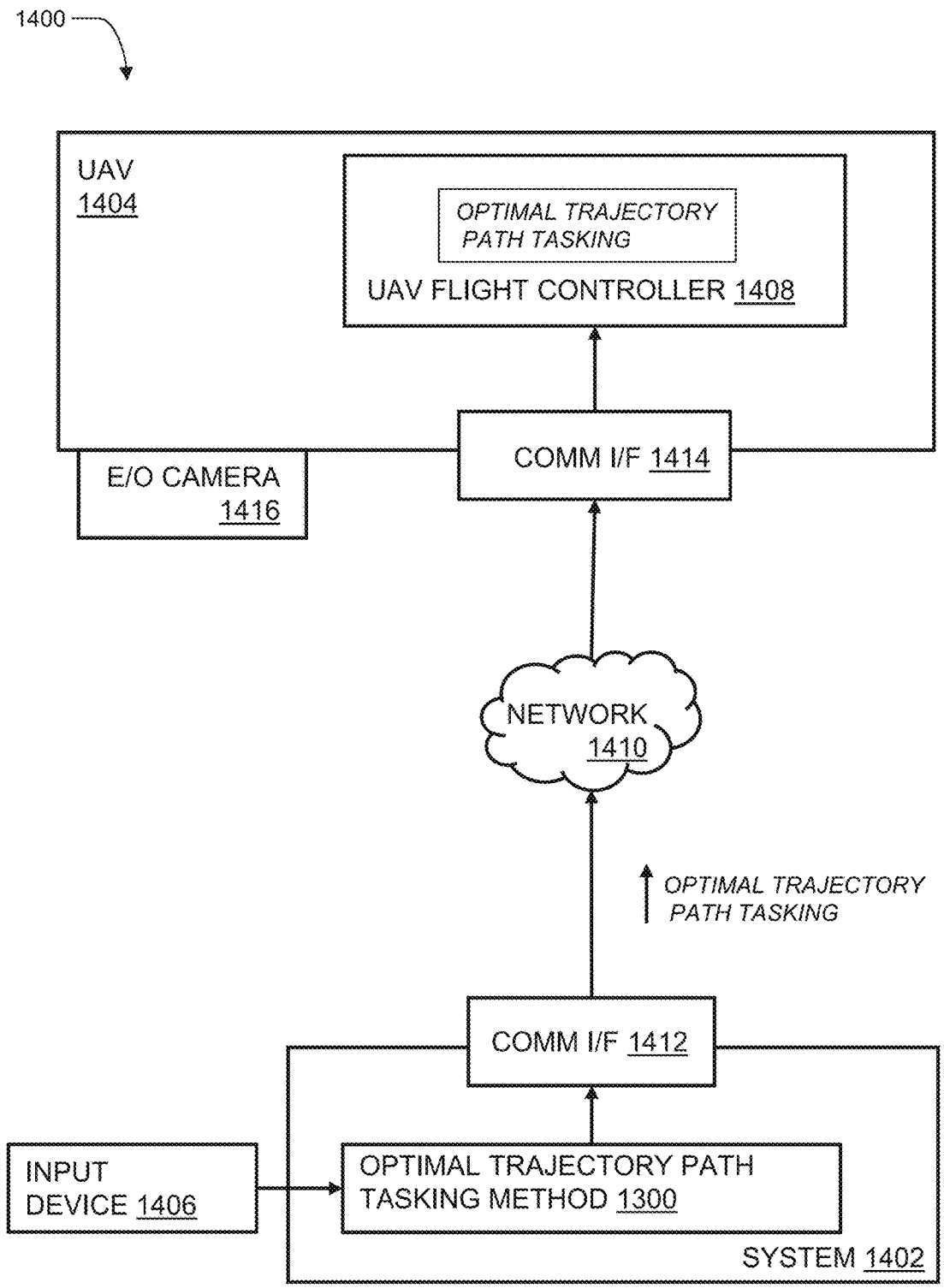
FIG. 14 is a diagram illustrating an optimal trajectory path tasking system generating and providing an optimal trajectory path tasking to a UAV in accordance with one embodiment of the invention.

FIG. 14 is a diagram 1400 illustrating an optimal trajectory path tasking system 1402 generating and providing an optimal trajectory path tasking to a UAV 1404 in accordance with one embodiment of the invention. Optimal trajectory path tasking system 1402 includes method 1300 stored as computer executable instructions which can be implemented on system 1402. Method 1300 can be implemented on system 1402 using any suitable hardware and/or processor-executed software or processor-executed firmware via one or more processors and associated electronic memory. User inputs to system 1402 and method 1300 can be input via one or more inputs devices 1406 communicatively coupled to system 1402. For example, as earlier described, examples of user inputs to system 1402 include: a defined payoff functional; one or more user defined constraints; a user defined dynamic model of the sensor and UAV in a state space; one or more user defined attributes of the collection targets in a label space, and a mapping relating the state space to the label space.

Method 1300 utilizes the user inputs to generate an optimal trajectory path tasking as earlier described herein, and system 1402 communicates the optimal trajectory path tasking to a flight controller 1408, or other guidance system, of a UAV 1404. For example, the optimal trajectory path tasking generated by method 1300 can be communicated via a communication interface (I/F) 1412 of system 1402 to a communication I/F 1414 of UAV 1404 over a network 1410 connection. Flight controller 1408 receives the optimal trajectory path tasking and guides the flight of UAV 1404 in accordance with the optimal trajectory path tasking to allow for collection on collection targets by a payload sensor, such as E/O camera 1416 of UAV 1404.

System 1402 may further include standard devices such as display device, a printer, as well as one or more standard input-output (I/O) devices, such as a compact disk (CD) or DVD drive, or other porting device for inputting data to and outputting data from 1402. In one embodiment, method 1300 is loaded onto system 1402 as executable code via an I/O device, such as from a CD, DVD, or other digital communicable form containing method 1300, or via a network download. Method 1300 can be stored in memory of system 1402 and executed on system 1402. In some embodiments, system 1402 may be coupled to other networks (not shown). In some embodiments, method 1300 can be fully or partially implemented on an external network. In one embodiment, method 1300 can be embodied as a computer program product in a medium configured to store or transport computer readable code. Some examples of computer program products are CD-ROM discs, DVDs, ROM cards, and computer hard drives.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. A method for generating an optimal trajectory path tasking for collection of data on one or more collection targets by an unmanned aerial vehicle (UAV), the method comprising:
   receiving an input of a payoff functional, wherein the payoff functional is based on a task performance measured by an atomic return function given as:

$$R_a(l, \mathbb{L}_a(t); t, t_a^w) \begin{cases} \geq 0 & \text{if } l \in \mathbb{L}_a(t) \text{ and } t \in t_a^w \\ = 0 & \text{otherwise} \end{cases}$$

where, $$\int_{supp(R_a)} R_a(l, \mathbb{L}_a(t); t, t_a^w) d\mu > 0$$

and $\mu$ is a Lebesgue measure over $supp(R_a) := \mathbb{L}_a(t) \times t_a^w$, and wherein the atomic return function is integrated over the mathematical support of a task label in a label space and wherein the task performance of a label space trajectory is evaluated as:

$$K_a[l(\cdot)] := \int_{t_0}^{t_f} R_a(l(t), \mathbb{L}_a(t); t, t_a^w) dt;$$

receiving an input of one or more constraints with respect to at least one of an engineering constraint or an operational constraint of the UAV or a sensor on the UAV;
   receiving an input of a dynamic model of the UAV and the sensor in a state space;
   receiving an input of one or more attributes of one or more collection targets in a label space;
   receiving an input of a mapping relating the state space to the label space;
   receiving an input of a trajectory optimization problem formulation;
   solving a trajectory optimization problem formulation to generate an optimal trajectory path;
   generating an optimal trajectory path tasking for the UAV for collection on the one or more collection targets by the sensor; and,
   providing the optimal trajectory path tasking to a flight controller of the UAV.

2. The method of claim 1 wherein the one or more constraints is a time on task functional given as:

$$T_a[l(\cdot)] := \int_{t_0}^{t_f} \mathcal{I}(l(t), \mathbb{L}_a) dt$$

is based on a Kronecker indicator function:

$$\mathcal{I}(l, \mathbb{L}_a) := \begin{cases} 1 & \text{if } l \in \mathbb{L}_a \\ 0 & \text{if } l \notin \mathbb{L}_a \end{cases}.$$

3. The method of claim 1 wherein the one or more constraints is a time on task functional given as:

$$T_a[l(\cdot)] := \int_{t_0}^{t_f} \mathcal{I}(l(t), \mathbb{L}_a) dt$$

based on a time-sensitive Kronecker indicator function:

$$\mathcal{I}(l, \mathbb{L}_a(t); t, t_a^w) := \begin{cases} 1 & \text{if } l \in \mathbb{L}_a(t) \text{ and } t \in t_a^w \\ 0 & \text{otherwise} \end{cases}.$$

4. The method of claim 1 wherein the one or more attributes of collection targets are represented as task attributes in terms of a real value label space.

5. The method of claim 1 wherein a non-smooth step function is approximated by a smooth sigmoid function given as:

$$S = \frac{1}{1 + e^{-\alpha(\xi - 2)}}$$

where a slope parameter $\alpha$ is user defined.

6. An unmanned aerial vehicle (UAV) payload tasking system for generating an optimal trajectory path tasking for collection of data on one or more collection targets by a sensor on the UAV comprising:
   at least one processor programmed to:
   receive input of a payoff functional, wherein the payoff functional is defined by a summation of atomic returns given as:

$$P[l(\cdot), x(\cdot), u(\cdot), t_0, t_f] := \sum_{i=1}^{N_y} \int_{t_0}^{t_f} R_i(l(t), \mathbb{L}_i(t); t, t_i^w) dt;$$

receive input of one or more constraints with respect to at least one of an engineering constraint or an operational constraint of the UAV or a sensor on the UAV;
   receive input of a dynamic model of the UAV and the sensor in a state space;
   receive input of one or more attributes of one or more collection targets in a label space;
   receive input of a mapping relating the state space to the label space;
   receive input of a trajectory optimization problem formulation;
   solve the trajectory optimization problem formulation to generate an optimal trajectory path;
   generate an optimal trajectory path tasking for the UAV for collection on the one or more collection targets by the sensor; and,
   provide the optimal trajectory path tasking to a flight controller of the UAV.

7. The system of claim 6 wherein the one or more constraints is a time on task functional given as:

$$T_a[l(\cdot)] := \int_{t_0}^{t_f} \mathcal{I}(l(t), \mathbb{L}_a) dt$$

based on a time-sensitive Kronecker indicator function:

$$\mathcal{I}(l, \mathbb{L}_a(t); t, t_a^w) := \begin{cases} 1 & \text{if } l \in \mathbb{L}_a(t) \text{ and } t \in t_a^w \\ 0 & \text{otherwise} \end{cases}.$$

8. The system of claim 6 wherein the one or more attributes of collection targets are represented as task attributes in terms of a real value label space.

9. The system of claim 6 wherein a non-smooth step function is approximated by a smooth sigmoid function given as:

$$S = \frac{1}{1 + e^{-\alpha(\xi - 2)}}$$

where a slope parameter α is user defined.

10. A non-transitory computer readable medium with computer-executable instructions for generating an optimal trajectory path tasking for collection of data on one or more collection targets by a UAV, the computer readable medium having computer executable instructions for:

receiving input data comprising:
  a payoff functional, wherein the payoff functional is defined by a summation of atomic returns given as:

$$P[l(\cdot), x(\cdot), u(\cdot), t_0, t_f] := \sum_{i=1}^{N_y} \int_{t_0}^{t_f} R_i(l(t), \mathbb{L}_i(t); t, t_i^w) dt;$$

one or more constraints with respect to at least one of an engineering constraint or an operational constraint of the UAV or a sensor on the UAV;
  a dynamic model of the UAV and the sensor in a state space;
  one or more attributes of one or more collection targets in a label space;
  a mapping relating the state space to the label space;
  a trajectory optimization problem formulation;
solving the trajectory optimization problem formulation to generate an optimal trajectory path;
generating an optimal trajectory path tasking for the UAV for collection on the one or more collection targets by the sensor; and,
providing the optimal trajectory path tasking to a flight controller of the UAV.

11. The non-transitory computer readable medium of claim 10 wherein the one or more attributes of collection targets are represented as task attributes in terms of a real value label space.

12. The non-transitory computer readable medium of claim 10 wherein a non-smooth step function is approximated by a smooth sigmoid function given as:

$$S = \frac{1}{1 + e^{-\alpha(\xi - 2)}}$$

where a slope parameter α is user defined.

* * * * *